May 18, 1937.   P. KOLLSMAN   2,080,490
REMOTE CONTROLLED INDICATOR WITH STABILIZED
HEAD, PITCH AND BANK INDICATING UNIT
Original Filed April 5, 1932   4 Sheets-Sheet 3
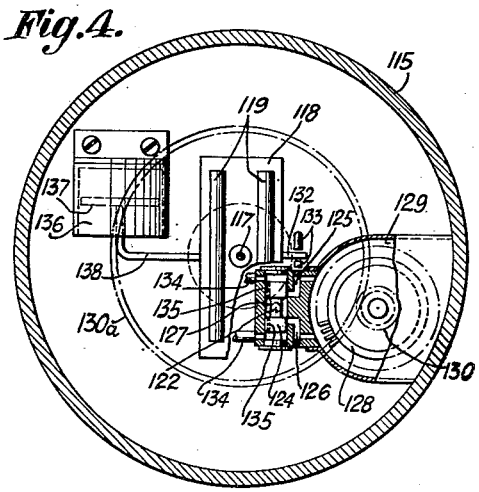
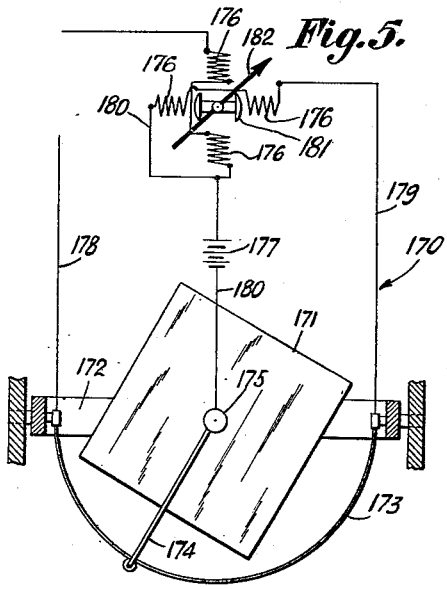
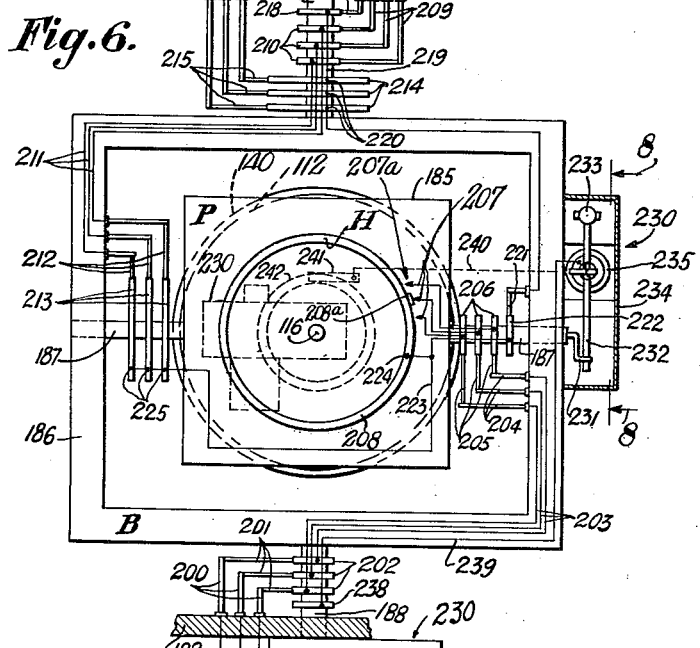
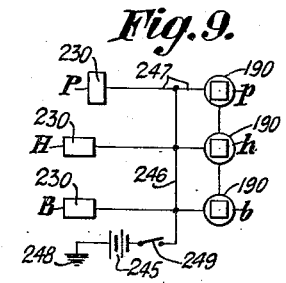
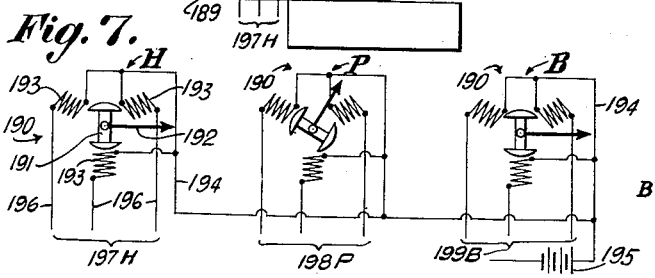
INVENTOR
Paul Kollsman
BY
Miss Schumacher
ATTORNEY

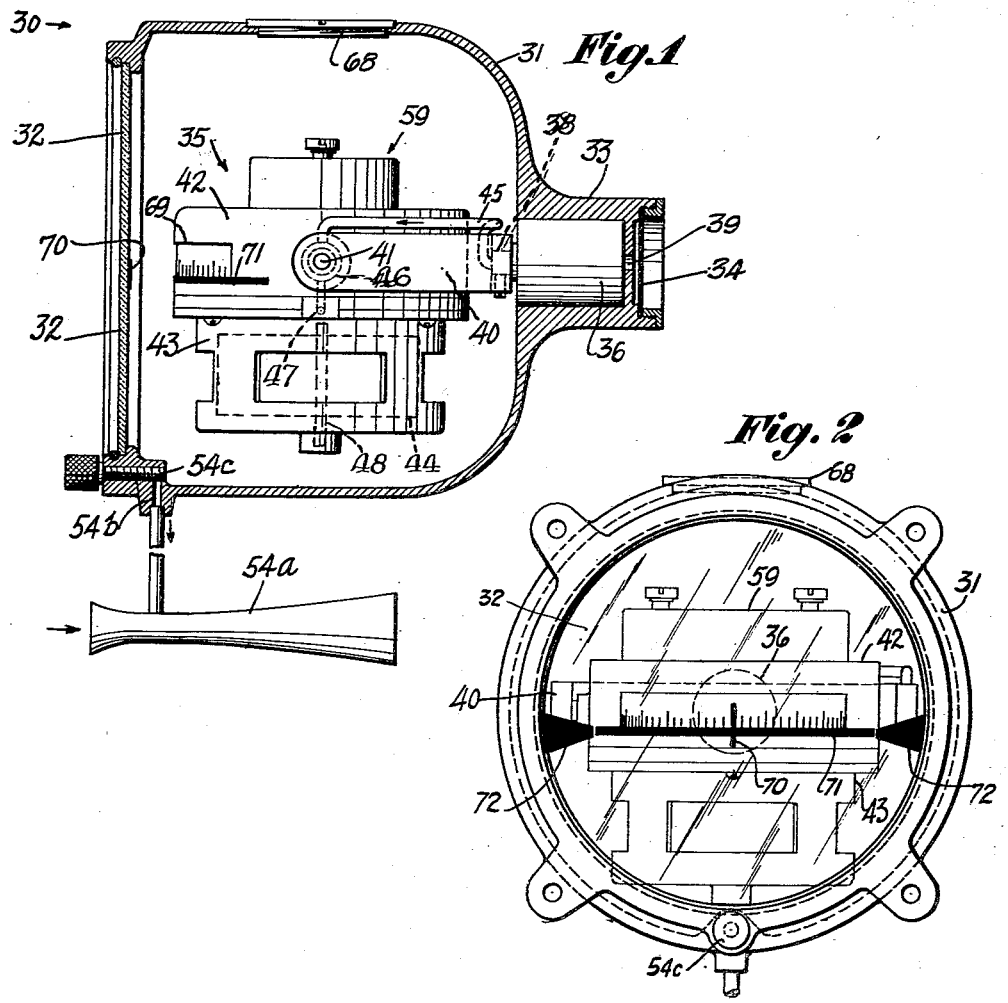
May 18, 1937.  P. KOLLSMAN  2,080,490
REMOTE CONTROLLED INDICATOR WITH STABILIZED
HEAD, PITCH AND BANK INDICATING UNIT
Original Filed April 5, 1932  4 Sheets-Sheet 1

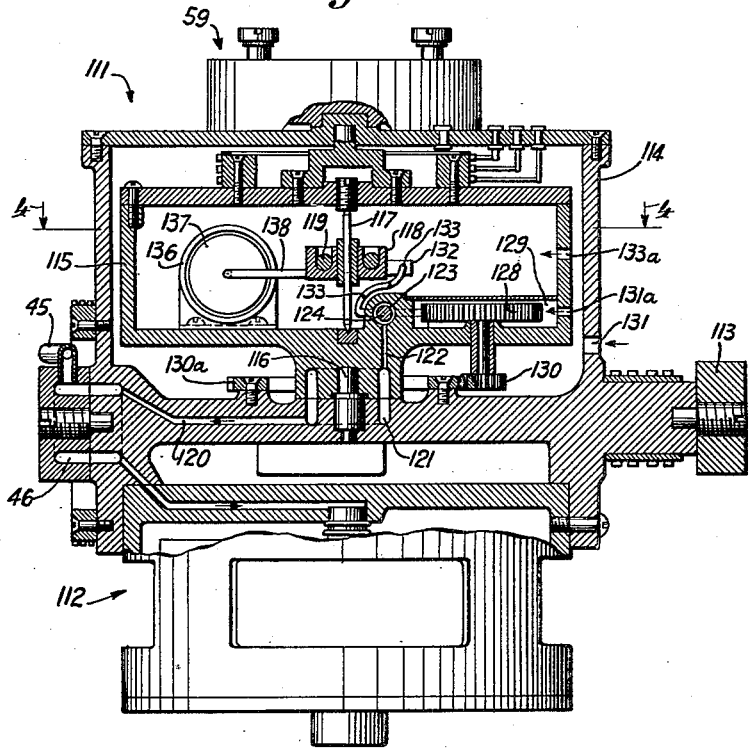
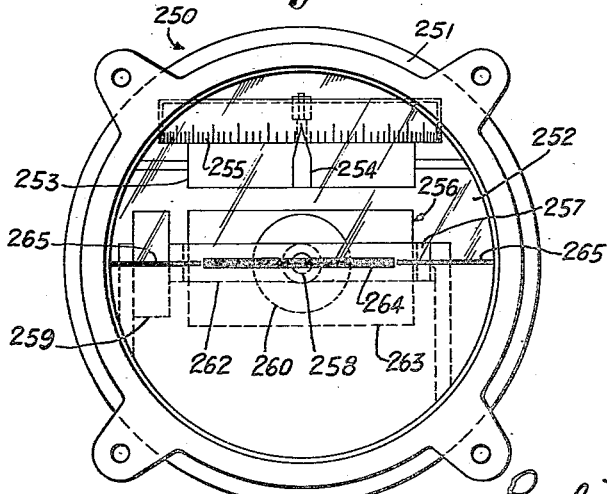

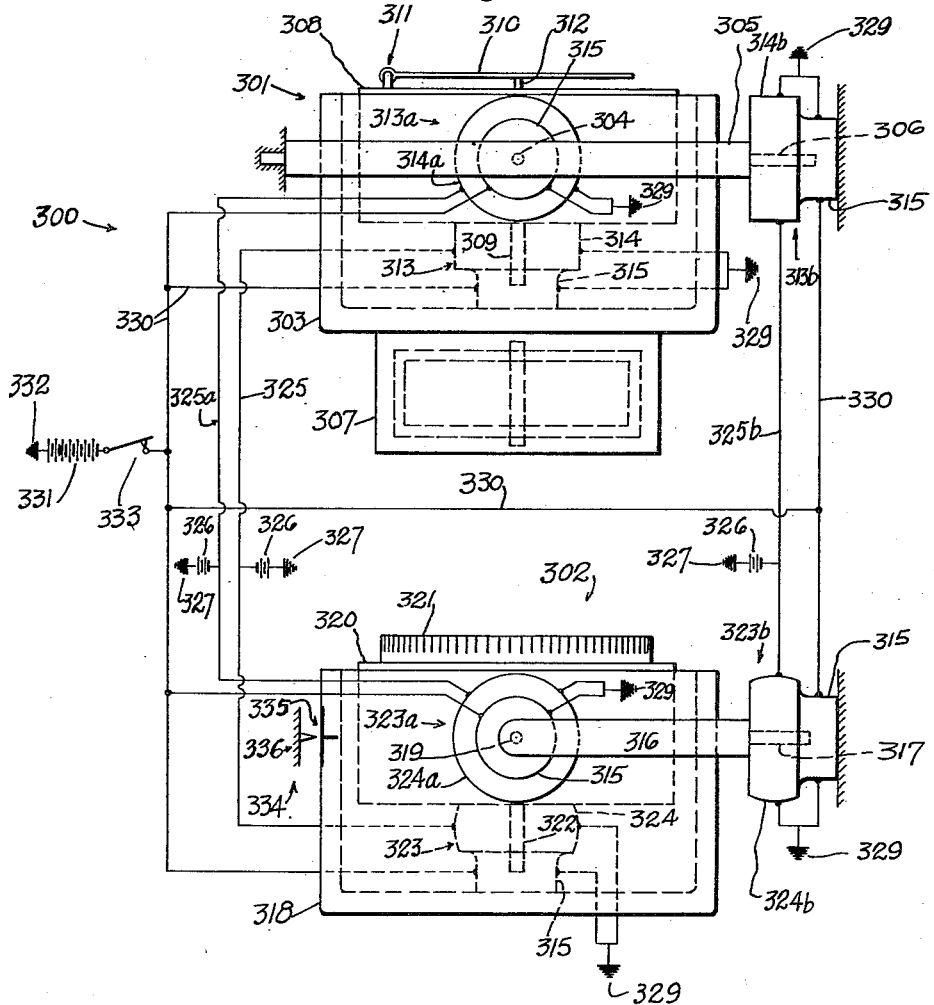

Patented May 18, 1937

2,080,490

UNITED STATES PATENT OFFICE 2,080,490

REMOTE CONTROLLED INDICATOR WITH STABILIZED HEAD, PITCH, AND BANK INDICATING UNIT

Paul Kollsman, New York, N. Y.

Application April 5, 1932, Serial No. 603,432
Renewed September 26, 1936

9 Claims. (Cl. 33—204)

This invention relates to indicating or controlling devices, with particular reference to aircraft and instruments therefor.

One object of the invention is to provide an improved gyroscopically stabilized means responsive to the earth's magnetic field, and to other variable forces, and indicating or repeater means in improved unitary association with said means for showing different conditions.

Another object is the provision of an improved unitary device including stabilized means responsive to head, pitch and banking of an aircraft, including a directional magnet, actuator means reliably, delicately responsive to the magnet, and repeater means for showing head, pitch, and banking indications.

Another object of the invention is the provision of a device including remote controlled repeater means, a head, pitch and banking unit for operating the same, said unit comprising a follow up system for an element of the unit, and means in improved coordination with the repeater means, said unit and said system for setting the same.

Another object of the invention is to furnish an improved remote control apparatus adapted to actuate a plurality of members by individual simplified action, and comprising a compact unitary means of a different type to cause said actions to occur simultaneously.

A further object of the invention is to furnish an improved device of the nature set forth having relatively few and simple parts and which is inexpensive to manufacture and assemble, convenient to operate, durable, accurate, reliable and efficient to a high degree in use; and which may embody one or more features of the invention in different improved combinations and arrangements.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view of a device generally embodying the master unit of the invention with parts in elevation and other parts in vertical section.

Fig. 2 is a view in front elevation thereof with a part removed.

Fig. 3 is a view in vertical section with parts in elevation showing an indicator having a follow up motor and remote control means, embodying the invention.

Fig. 4 is a horizontal sectional view taken on line 4—4 of Fig. 3.

Fig. 5 is a schematic plan view showing a modification of a follow up means.

Fig. 6 is a schematic plan view showing a device embodying the invention and including a remote control means.

Fig. 7 is a diagrammatic view showing the circuit for the remote control means.

Fig. 8 is a sectional view taken on line 8—8 of Fig. 6, showing a setting device for the remote control means.

Fig. 9 is a diagram showing a circuit for the remote control setting means.

Fig. 10 is a view in front elevation of a remote controlled indicator embodying features of invention.

Fig. 11 is a schematic drawing of a device embodying the basic principles of the invention.

The advantages of the invention as here outlined are best realized when all of its features and instrumentalities are combined in one and the same structure, but useful devices may be produced embodying less than the whole.

It will be obvious to those skilled in the art to which this invention appertains, that the same may be incorporated in several different constructions. The accompanying drawings, therefore, are submitted merely as showning a preferred exemplification of the invention.

Generally described, this invention provides a device for indicating the primary motions of an aircraft, including head, pitch, and banking, without material disturbance by the aircraft. Thus the invention provides a stabilized master unit responsive to changes of an aircraft in head, pitch and banking, and repeater means conveniently located, for example, at the pilot's instrument board, whereas the master unit may be located at any point that is relatively free of undue vibrational, magnetic or other disturbances; and it is a primary purpose of the invention to coordinate the said unit with the repeater means so as to obtain a single, compact system which will afford accurate indications of changes in these most important matters of head, pitch and banking. The master unit may comprise a simple directional magnet mounted for universal stabilized movement, and a follow up member which is responsive to the directional magnet without requiring normal direct contact or a disturbing positive engagement therewith, to cause the follow-up member to continuously reliably, accurately operate a remote control means in association with the stabilized magnet mounting means to thus continuously reliably and accurately control the repeater means. Preferably the remote control member is pneumatically responsive to the directional magnet, as with the latter acting as a vane between opposed nozzles, whereby are avoided sticking of the magnet and impact thereon, with disturbance of the master unit and hence of the system; the pneumatic action referred to serving to cushion the directional magnet without affecting the sensitivity thereof. The remote control means may be of any desired type, and may employ step by step contact transmitters or magnetically acting devices. These may be operated, in part, by the magnet mounting means and by the follow up member to obtain actuation of the remote control means in part or simultaneously throughout, by the stabilized master unit, with consequent accuracy and reliability in a high degree. The repeater means may include one or more repeaters or repeater parts, as may be desired. An embodiment of the invention may be defined as including a support, a gimbal element mounting said support for universal movement, a gyro vertical engaged with the support for stabilizing the same, a directional magnet on said support, pneumatic follow-up means controlled by relative azimuthal movement between said magnet and said support, electrical transmitters controlled respectively by said follow-up means, by angular movements of said support relatively to said gimbal, and by angular movements of said gimbal relatively to the aircraft, and repeating indicators, one controlled by the transmitter responsive to the follow-up means, and the other controlled by the other transmitters, respectively. The gyro referred to, according to a broad aspect of the invention, may consist of non-magnetic-affecting or electrical insulating material to increase the reliability of any magnetic compass, or of the directional magnet of the master unit, as against any possible stray magnetic forces. The invention may also comprise novel setting means hereinafter described, and which, in certain aspects, is capable of diverse use.

Referring in detail to the drawings, 30 denotes a master unit embodying a feature of the invention. The same may include a mounting such as a casing 31 supported in any suitable manner. This casing may be wholly closed, if desired, and may have a front window 32 of a transparent material such as glass. At the rear of the casing, may be provided a hub 33 or other tubular portion connected or merely open to a source of fluid, as air. At the end portion of said hub, a dust removing means or screen 34 may be provided.

Mounted within the casing is a device 35 which is gyroscopically stabilized and is responsive to the earth's magnetic field. This device is so arranged as to have two axes of freedom, and may include a gyro driven preferably by air. Therefore a sleeve 36 is mounted in the hub 33, and in this sleeve is journaled a hollow shaft 38, which communicates with an inlet opening 39 whereby air is transmitted to said shaft. Fixed on the shaft is a gimbal element 40 having alined hub portions upon which may be journaled at 41 a gimbal means or casing 42 having corresponding hub portions. The latter may include a lower section 43 in which a gyro 44 is mounted. Extending from the hollow shaft 38 is a passage 45 communicating with annular registering passages 46 (Fig. 3) in the hubs at one of the pivots 41, and a passage 47 may lead therefrom to a point or points where the air for driving the gyro 44 is supplied thereto, in any suitable manner.

The arrangement of the device 35 is preferably such as to render it universally pendulous and balanced in every direction. The casing or frame 43 carrying the gyro is therefore mounted below the plane determined by the axes at 41 and 38 and the gyro may be positioned to spin about a vertical axis 48 central with the device 35.

Air can be supplied to the gyro under pressure or suction, or both, as by means of a Venturi tube 54a to which air is supplied in the direction of the arrow due to the travel of the aircraft, creating a suction through passage 54b which may be controlled by a screw type valve 54c, the suction being communicated to the gyro to cause rotation and to damp oscillations thereof, by air entering at 39.

The invention may also include the provision of a gyro which is inherently incapable of affecting a magnetic field, and hence the gyro can be made of bakelite, glass or other high resistor or insulating materials. Hence the gyro cannot act as an armature to affect the magnetic field of the directional magnet or to increase the effect thereon of stray magnetic forces.

The casing 42 may have an opening or window 69 through which the compass card is visible, the scale divisions thereof being read with respect to any suitable relatively stationary mark such as 70 which may be provided on the window 32. In order to show pitch and banking, suitable indications may be provided operating as between the gyroscope and a relatively stationary part. Thus the casing 42 may have an elongated straight line mark 71 at the base of window 69, associated with horizontally spaced marks 72 on window 32. It will be perceived that the marks 71, 72 are disposed substantially in the horizontal plane determined by the axes at 38 and 41 so that accurate reading is assured, and that, due to the proximity of the indicia on the compass card and at 70, 71, 72 easy and rapid observation is afforded, the arrangement being practically unitary in its nature for showing head, pitch and banking of the aircraft. It may be noted that pitch is indicated by a vertical interrelative movement between marks 71, 72, while banking is shown by an interrelative angular movement as between the mark 71 and line determined by marks 72. Moreover, combined pitch and banking may likewise be observed by noting the relative position of marks 71, 72.

In Figs. 3 and 4 is shown a device 111 which may include a master unit such as 35 and which may have a follow up system. This device may be gyroscopically stabilized at 112 and may have at least two axes of freedom including a gimbal element 113 on which the casing 114 is pivotally supported. Within said casing, an inner casing 115 may be provided rotatably journaled therein at 116 about an axis that may be alined with the gyro. Within the inner casing is a spindle 117 alined with said axis and having a carrier 118 for one or more magnetic elements 119 that are responsive to the earth's magnetic field. A compensator 59 for the magnetic elements 119 may be suitably mounted on casing 114.

A follow up means may be provided actuable by any suitable power but preferably air is used for this purpose. Hence an air stream may be provided that may be caused to operate both the gyro and the follow up means. Accordingly, there may be a passage 120 connected to annular passage 46, the passage 120 communicating with a similar annular passage 121 about the axis 116. From the latter a passage 122 leads to a control valve such as a chamber 123 having a piston 124 therein. The cylinder may have spaced passages 125, 126 alternately opened and closed by the piston which may have a central passage portion 127 of reduced diameter. Associated with the passages 125, 126 is a rotor or turbine wheel 128 enclosed in a chamber 129. This rotor is connected to drive a pinion 130 that engages an annular gear 130a which is secured to the outer casing 114. Hence rotation in either direction can be caused as between the inner and outer casings 115, 114. It will be understood that while the air flow may occur in any desired direction, it preferably occurs through an inlet opening 131 in outer casing 114 which opening communicates with a main casing such as 31 having a suitable inlet. The chamber 129 of the inner casing 115 may have an opening 131a so that the air passes around the rotor according as the passage 125 or passage 126 is open.

For the purpose of controlling the piston 124, suitable means are provided responsive to the magnetic element 119. For example, the carrier 118 may have a vane or valve 132 operating between passages 133 connected separately at 134 to the ends of the cylinder 123. Extending through the end portions of the piston are small bore passages 135 which intercommunicate passage 122 at the central reduced part of the piston with the passages 133 so as to cause a corresponding air pressure on the opposite ends of the piston. Air flow is caused to the passages 133 through an opening 133a in the inner casing 115. Now, if a relative rotation occurs between the magnetic elements 119 and the rest of the device 111, valve 132 moves from central position between passages 133 so as to open one of these passages and close the other. This causes the air pressure at the opposite ends of piston 124 to become unbalanced so that the piston moves and closes one passage such as 125 and opens the other passage such as 126. The rotor 128 begins to turn and moves the inner casing 115 in the proper direction until the valve 132 is again in substantially central balancing position. Actually the device constantly hunts between the narrow limits determined by the free spacing between the passages 133.

The control exercised by the vane 132 of the magnet is mechanical, as distinguished from electrical contact and light projection and control means. The mechanical action thus defined is considered the preferred and most sensitive mode of operation.

The principle of the motor or follow up means of the device 111 is applicable between any movable parts whatever, and can be utilized, for instance, between a pair of gimbal elements, or a gimbal element and a stationary member. The complete system, including repeater and remote control means, of which the device 111 forms a part will be described hereinafter.

In order to damp the magnetic element 119, a suitable mechanical damper may be provided, such as a cylinder 136 fixed to casing 115 and closed at one end, and having a light piston or plate 137 movable therein with sufficient clearance to preferably avoid frictional contact with the cylinder walls. Said piston is mounted on a rod 138 connected to carrier 118 so as to have an oscillatory motion. Air moves restrictedly back and forth of the piston whereby the damping action is obtained.

In Fig. 5 is shown introductorily a simple device 170 including a remote controlled indicator 182. Said device may include a gyroscopically stabilized means 171 responsive to the earth's magnetic field and may have a motor as hereinbefore described, and gimbal elements such as 172 affording axes of freedom. Mounted on the gimbal element 172 an electrical means may be provided wherein a potential difference or the like may be obtained under the control of the means 171. For instance, a resistor element 173 may have a switch arm 174 slidingly engaged thereby under the operation of the means 171, said switch arm moving with the means 171 in suitable relation thereto about an axis at 175. The indicator 182 may be any conventional type so connected in circuit as to be actuated according to said potential difference. Thus the indicator may have inductance coils 176 connected with a battery 177 or other source of current, and in multiple with the different sections of resistor 173 into which the switch arm may divide the same. Thus the ends of the resistor are separately connected by wires 178, 179 with inductances 176, and the inductances being connected with the battery and switch arm by wires 180. Actuated by the inductances 176 is a rotatable armature or magnet 181 carrying an indicator or pointer 182 for showing a condition or heading. As the switch arm 174 moves, the currents flowing to the different inductances 176 are varied, thereby causing operation of the indicator.

In Figs. 3 and 6 to 9 is shown a different preferred kind of transmitter, which may function mechanically or electrically as any conventional step by step transmitter as shown, for example, in U. S. Patent to E. A. Sperry, No. 1,296,440, no invention being claimed in the transmitter per se. This transmitter is shown applied to the gyroscopically stabilized means responsive to the earth's magnetic field, so as to remotely control an indicator or indicators for showing head, pitch, and banking of the aircraft. Where pitch and banking readings alone are desired, a gyroscope will suffice for functioning as the actuator. It will be understood that, instead of operating indicators, the invention may be used for automatic control of proper steering or guiding apparatus of the vehicle. However, the advantages of the invention are best exemplified in a device of unitary character as herein shown, having actuating means remote from the engine of the aircraft, and having a remote control system and indicating means operated thereby located near the engine and pilot's seat, for showing the head, pitch and banking of the aircraft.

Fig. 6 shows diagrammatically a gyroscopically stabilized device responsive to the earth's magnetic field. This device may have a head indicating unit 185, which may correspond to that at 171, and may include a magnetic north seeking element, a gyro rotor, and a follow up motor as shown in Fig. 3. Said unit 185 may be pivotally mounted on a gimbal ring 186 as by means of shafts 187, and the gimbal ring 186 may be similarly mounted by means of shafts 188 on supports 189. With the axes of shafts 188 extending fore and aft, it will be noted that a relative turn between gimbal element 186 and its supports 189 is indicative of banking. Hence this gimbal element may also be designated by letter B. Similarly a relative turn between 185 and element B is indicative of pitch, so that 186 may also be designated by letter P. The means responsive to the earth's magnetic field, or indicative of heading may in this instance be designated by letter H which may be applied to a part which turns with said means about a vertical axis, and may be considered as representative thereof. Separate means may be used for transmitting indications of the different motions above referred to, and separate indicator parts may be operated thereby.

Thus remote controlled indicators 190 may be provided which may be similar in principle, except that they may be differently arranged and calibrated, so that one indicates head H, another pitch P, and a third banking B. While these indicators may be combined together, yet the invention is more clearly understood by the representation of separate indicators. An important advantage in using separate indicators or repeaters as stated is that they may be separately conveniently mounted on the instrument board of an aircraft and can be more easily inspected and repaired or replaced, besides being cheaper and more compact than a single repeater for all indications. One possible arrangement is to provide one repeater for head and another for pitch and banking indications.

Each indicator 190 may have an armature 191 carrying a pointer 192, and inductively influenced by suitable magnetic field which may include a plurality of coils 193, only three of which are schematically shown herein. The coils of each indicator are connected in multiple by conductors 194 with the positive terminal of a source of current or battery 195 and each of the coils has a separate wire or conductor 196 leading to the device 111. Hence there are three units or cables of conductors 197H, 198P and 199B leading to said device.

Considering the unit 197H, the wires thereof are connected individually to conductor elements 200 carried by support 189, and having brushes 201 or the like for contacting conductor rings 202 on shaft 188. From these rings, wires 203 may extend along the gimbal element to member 204 fixed thereon and carrying brushes 205 or the like for slidingly electrically contacting conductor rings 206 on shaft 187. From these rings 206, conductors 207 extend by means of contacts 207a for successive movable electrical engagement with the contact 208a of a ring transmitter member 208 of relatively large diameter fixed on the unit 185. It will be understood that the transmitter ring 208 is so constructed and the conductors 207 so arranged relatively thereto as to cause one after another of the three conductors 207 to effect electrical contact so that a step by step transmission is obtained. The armature 191 would turn through a large angle for a small movement of the ring 208, requiring corresponding calibration of the repeater. This schematic showing may in actual practice be modified so that the repeater moves through the same angle as the master or transmitter ring thereat. For instance, a large number of coils 193, and a series of contacts 208a spaced further apart than the contacts 207a may be employed. In a very simple system, a single contact 208a would be used, and a large number of contacts 207a disposed around the ring 208 in positions angularly corresponding to their respective coils 193 to which they are connected by individual wires 207 may be used. Thus upon rotation of the ring 208, the contact 208a successively engages contacts 207a for successive energization of the large number of coils 193, so that the repeater or armature 191 moves in synchronism with the ring 208. There will of course be a sufficient number of elements 200 to 208 to provide individual circuits for the coils 193. Similar systems may be used for actuating the pitch and banking repeaters.

The unit 198P may likewise be connected to brushes 209 mounted on an opposite portion of the support 189, and engageable with rings 210 on adjacent shaft 188, conductors 211 leading from these rings to brushes 212 mounted on gimbal element 186, for slidingly contacting transmitter rings 213 fixed on a portion of shaft 187. Rings 213 may be of relatively large diameter and they and the conductors or brushes 212 may be arranged for successive engagement as by providing a contact (not shown) on each transmitter ring 213, and the several contacts being angularly spaced from each other. A similar arrangement including transmitter rings 214 and brushes or conductors 215 may be utilized in connection with conductor unit 199B. Rings 213 and 214 may be arranged according to the Sperry patent mentioned. The circuit may be completed by extending a conductor 216 from battery 195 to a brush 217 slidingly contacting a conductor ring 218 on shaft 188, and from which ring a conductor 219 may have contact at 220 slidably or otherwise at any desired region with each of the transmitter rings 214 thus completing the circuit therewith. The conductor 219 also extends along gimbal element 186 to brush or conductor 221 which contacts ring 222 on shaft 187 and from which ring may extend a conductor 223 which may slidingly engage transmitter ring 208 as at 224 for completing the circuit therewith. The conductor 223 may extend along the device 185 and effect sliding electrical contact as at 225 with each of the transmitter rings 213, completing the circuit thereto. It will be understood that all parts are electrically insulated wherever required, and that each group of transmitter rings may be made in the form of one ring or in any other conventional manner. It will be noted that for the necessary synchronous movement of the pitch and banking repeaters with respect to the master instrument, the number of coils 193 can be increased as necessary, with each coil having its individual circuit, and the number of rings 210, 213 and 214 being therefore correspondingly increased, and arranged as above noted.

In order to permit the system including the remote control apparatus to be reset in the event that an indicator 190 should fall out of step with the actuating indicator, a novel, simplified arrangement is provided which is applicable to different kinds of remote control means, and for different applications thereof. Separate setting devices 230 may be provided for correction in the head, pitch and banking indications, both at the actuating indicator and at the remote controlled indicator, and these devices may be of similar construction. Each may include a plurality of elements movable in opposition to each other, one of the elements being preferably automatic, and the device being arranged so as to cause a return of parts controlled thereby to an initial position in a single direct movement regardless of the position of such parts. One form of construction is that each of shafts 116, 187, and 188 which turns with a change in head, pitch, or banking, shall be provided with a member such as a crank arm 231. Associated with the latter is a movable member such as an arm 232 which is pivotally mounted at 233 in a casing 234. The arm 232 may constitute an armature of an electromagnet 235 that is normally energized so as to hold the armature against the force of a tension spring 236 and out of the path of rotation of the crank arm 231. When electromagnet 235 is released, the armature 232 moves under the influence of said spring so as to engage the crank and turn the same to an extreme position toward the left relative to Fig. 8. By making the crank offset of sufficient radial length, accuracy in setting is obtained, and the positiveness of the device may be further increased by providing a guide or notch 237 in the armature engageable with the crank arm in the extreme initial setting position.

The electromagnets 235 of each of the devices 230 may be energized in any suitable manner, but preferably devices used for instance, for a correction in pitch reading, and provided at the actuating indicator and at the remote controlled indicator are connected in a single circuit so as to be operated simultaneously by a unitary means such as a switch. Thus a conductor may lead from battery 195 to a ring 238 on shaft 188, and a conductor 239 may extend from said ring along the gimbal element 186 to electromagnet 235, the circuit being completed as by grounding. A conductor 240 may extend in any suitable manner from conductor 239 to a brush 241 engageable with a plain contact ring 242 for furnishing current to device 230 which is used for setting the unit 185 about its vertical axis. The device 230 for banking setting about shaft 188 can be connected into the circuit in a similar manner with conductor 239.

In Fig. 9 is shown diagrammatically the circuit for the different setting devices 230. Those at the actuating indicator may be marked P, H and B for pitch, head and banking respectively, and those at the remote controlled indicators 190 may be correspondingly marked p, h, and b. All the setting devices 230 may be connected in any suitable circuit in series or parallel, preferably the latter, and the circuit may be independently arranged so that operation of devices 230 will not affect any other part of the remote control means or associated devices. Thus a battery or source of current 245 may be provided having a main line 246 from which extend branches 247 individually to the different devices 230. The latter and the battery may be grounded as at 248. In the main line, a switch 249 may be provided, so that, on opening the same, all the electromagnets 235 are deenergized and the entire system moved as a unit to initial position, whereby a lack of synchronization is corrected. Then on again closing the switch 249, the system is adapted to operate in the normal manner.

It will be perceived according to Fig. 9 that the different remote controlled indicators 190 may also be similarly movable, as about vertical axes and according to suitable scales.

In Fig. 10 is shown a remote controlled repeater 250 which may show the indicators 190 and which may be of advantage where very little space is available on the instrument board of the aricraft. In this indicator, a fixed unit 253 may be provided that may have a stationary pointer 254 and a rotatable compass card 255. Unit 253 may be actuated in any suitable manner, or as shown at 190 in Fig. 7. The casing 251 may also have a unit 256 mounted therein, which unit may include gimbal elements affording two axes of rotary movement at 257, 258, lying in a normally horizontal plane. Actuating means such as 259, 260 may be provided separately controlling the movement about the respective axes. The actuating means 259, 260 may be of any suitable type and can be devices such as shown at 190 in Fig. 7. One of the means 259 may operate between the gimbal element 262, and the other means 260 may operate between gimbal element 262 and a member 263. The latter may be of any suitable size, weight, or form and may be balanced in every direction about the axis at 258. Said member 263 may merely carry an elongated mark 264 lying in the plane of axes 257, 258, and the window glass 252 may carry marks 265 alined with mark 264 at opposite ends thereof, whereby pitch and banking is indicated, according as the mark 264 moves up or down, or angularly about the axis at 258.

Various features of the invention such as the follow up motor, setting means for a power transmission or remote control means, nonmagnetic gyro, may be used individually or in different combinations, according to the scope of the invention. The electrical remote control means is intended herein to be illustrative of any remote control system, and is preferably used to disclose a coordination with a step-by-step transmitter means. An electrical remote control system may tend to create magnetic eddy currents, but this invention is advantageous in positioning a master unit where it will be away from such untoward magnetic influences as can be thus avoided. It is desirable not to unduly rely on magnetic shielding means, which may partially restrict access of the earth's magnetic field to the directional magnet of the master unit. By this invention, even such magnetic effects as may be caused by an electrical transmitter are reduced so as to have little or no effect on the directional magnet. Thus, in combination with the pneumatic follow up means, a single, unitary system for head, pitch and banking indications may be used at the master unit, in the combinations and according to the arrangements herein defined.

In Fig. 11 is shown a schematic representation of a complete indicator system embodying the invention 300. According to this system, any magnetic, gyroscopic master indicator 301 causes complete follow-up operation of a device 302 having indicators or elements responsive to change in head, pitch or banking of the master, about corresponding vertical and horizontal axes. The master 301 may have a casing 303 pivotally mounted at 304 in a gimbal 305 having alined shafts including a shaft 306 to furnish a pivotal mounting about an axis at right angles to the axis 304 and in the same horizontal plane. The casing 303 may be pendulous and stabilized by a suitable gyro 307. Within the casing 303 is mounted a device or casing 308 rotatable upon a vertical shaft 309 carried by the casing 303, and having a magnet 310 for controlling as at 311 a suitable follow-up motor, for example, of the type disclosed in Figs. 3 and 4. The axis 312 of the magnet may be in vertical alinement with the gyro axis and the shaft 309. A control unit 313 includes the follow-up motor referred to shown as at 314 with its casing affixed to the casing of a setting element such as 315 (corresponding to the device shown in Fig. 8) secured to the casing 303. A control unit 313a may be fixed to a part such as the gimbal 305 so as to be responsive to an angular movement of trunnion 304, and likewise a control unit 313b may be fixed to a stationary support so as to be responsive to an angular movement of trunnion 306. Each unit 313a and 313b may include follow-up motors or merely transmitter portions of an electrical repeater system, as indicated at 314a and 314b, and each unit may include a setting element 315. The repeater 302 may include a gimbal 316 having a trunnion 317 and pivotally supporting a casing 318 at an axis 319 which may be in the horizontal plane of and at right angles to the axis 317. Within the casing 318 is mounted a casing 320 carrying a compass card 321, and said casing 320 being rotatable about a vertical axis as at 322. Control units 323, 323a and 323b may be provided at each of the respective three axes of the repeater, each including a setting element such as 315, and a suitable electrical synchronous motor such as 324, 324a and 324c. Motors or actuators 314, 314a and 314b may be connected to corresponding motors 324, 324a and 324c as by conductor cables 325, 325a and 325c, to each of which cables suitable current is supplied by battery or generator 326, grounded at 327 to complete the circuits to ground as at 329 in the well known manner. All of the corresponding units 315 of the master and transmitter grounded at 329, are electrically interconnected as at 330 in a single circuit, having a source of current 301, grounded at 332, and connected in the circuit by a normally closed switch 333.

In operation, the master actuators or motors 314, 314a and 314b cause corresponding individual movements of the corresponding repeater motors 324, 324a and 324b, so that the heading shown by magnet 310 may be read on card 321 and the pitch and banking about axes 304, 306 may be shown by corresponding movements of the casing 318 for indications at 334, as between markings 335 on the casing and relatively stationary reference elements 336, as shown in Fig. 2.

The bearings may be jeweled or spring mounted throughout to assure of minimum friction and maximum accuracy of alinement. Nonmagnetic materials may be employed wherever feasible, and hence the bearings of the gyroscopic stabilizing mounting or a substantial part of the latter can be made of stainless steel or the like. Soft iron shields may be used wherever necessary to protect the magnetic element from undesirable effects of the stabilizer, caused by magnetic materials or by eddy currents generated in the rotor of the stabilizer.

Certain errors in indication may be compensated for by properly relating the indicating means to the magnetic element for a certain average velocity of the gyro rotor, as by shifting the compass card to a suitable degree in opposite direction to that of rotation of the gyro rotor from the position of the magnetic element which is correct when the gyro is not rotating. This setting will always afford a correct indication if the gyro speed is maintained relatively uniform, and if the compass is so adjusted it will be largely immaterial whether the gyro magnetically affects the magnet. While the gyro may be electrically rotated it is preferably spun by means of a fluid such as an air flow caused by a pump such as a Venturi means. Likewise the power amplifying motors may be operated by any suitable means or even by power obtained by the gyro rotor. In general any kind of fluid power such as air or electricity may be used for operating any part of the system. The power amplifying motors may also be used for controlling the remote controlled indicator. The magnetic element which may consist of a permanent steel magnet, electromagnet, or the like may be kept alined with the gyro rotor in any suitable manner. While a separate element is used for indicating heading or direction, a single element may be arranged to show position including heading, pitch or banking, or any combination thereof, and thus the compass card itself may be arranged to be not only rotatable but also adapted to move angularly relative to a horizontal plane.

It will be appreciated that various changes and modifications may be made in the device as shown in the drawings, and that the same is submitted in an illustrative and not in a limiting sense, the scope of the invention being defined in the following claims.

I claim:

1. In an aircraft instrument, the combination of a support, a gimbal element mounting said support for universal movement, a gyro vertical on said support for stabilizing the same, a directional magnet on said support, pneumatic follow-up means controlled by relative azimuthal movement between said magnet and said support, electrical transmitters controlled respectively by said follow-up means, by angular movements of said support relatively to said gimbal, and by angular movements of said gimbal relatively to the craft, and repeating indicators, each controlled by a respective one of said transmitters.

2. In an aircraft instrument, the combination of a support, a gimbal element mounting said support for universal movement, a gyro vertical engaged with the support for stabilizing the same, a directional magnet on said support, pneumatic follow-up means controlled by relative azimuthal movement between said magnet and said support, electrical transmitters controlled respectively by said follow-up means, by angular movements of said support relatively to said gimbal, and by angular movements of said gimbal relatively to the craft, and repeating indicators, one controlled by the transmitters responsive to the follow-up means, and the others controlled by the other transmitters, respectively.

3. In an aircraft instrument, the combination of a support, a gimbal element mounting said support for universal movement, a gyro vertical on said support for stabilizing the same, a directional magnet on said support, pneumatic follow-up means controlled by relative azimuthal movement between said magnet and said support, electrical transmitters controlled respectively by said follow-up means, by angular movements of said support relatively to said gimbal, and by angular movements of said gimbal relatively to the craft, repeating indicators, each controlled by a respective one of said transmitters, and setting means for moving said repeaters, said follow-up means and said gimbal to respective initial positions, as and for the purpose described.

4. In an aircraft instrument, the combination of a support, a gimbal element mounting said support for universal movement, a gyro vertical on said support for stabilizing the same, a directional magnet on said support, follow-up means controlled by relative azimuthal movement between said magnet and said support, electrical transmitters controlled respectively by said follow-up means, by angular movements of said support relatively to said gimbal, and by angular movements of said gimbal relatively to the craft, repeating indicators, each controlled by a respective one of said transmitters, and setting means for moving said repeaters, said follow-up means and said gimbal to respective initial positions, as and for the purpose described.

5. In an aircraft instrument, the combination of a support, a gimbal element mounting said support for universal movement, a gyro vertical engaged with the support for stabilizing the same, a directional magnet on said support, pneumatic follow-up means controlled by relative azimuthal movement between said magnet and said support, electrical transmitters controlled respectively by said follow-up means, by angular movements of said support relatively to said gimbal, and by angular movements of said gimbal relatively to the craft, repeating indicators, one controlled by the transmitter responsive to the follow-up means, and the others controlled by the other transmitters, respectively, and a unitary setting means for moving said repeaters, said follow-up means and said gimbal to respective initial positions.

6. A device including in combination with an instrument member and a distant repeating indicator member for repeating the movements of said instrument member, of electrical transmitter means with which said members are engaged and with respect to which said members have predetermined corresponding initial positions, the members and the transmitter means having electrical contact elements successively engageable and disengageable along circular paths and adapted to permit setting movement between elements of the transmitter means and the members, individual mechanical means mechanically actuated for individually moving said members to corresponding initial positions by causing relative movements of said elements along said paths, and a unitary electrical means to render said mechanical means inoperative.

7. A compass having a magnet and means for stabilizing the same, including a gyro rotor consisting of an electrical insulating material substantially incapable of affecting the magnetic directing force of the magnet during rotation of the gyro rotor, and said material being adapted to resist the stresses caused by high rotational speeds of the gyro rotor.

8. In a compass, a universally mounted directional magnet, and means for stabilizing the same, including a gyro rotor consisting substantially entirely of an electrical insulating material, whereby rotation of the rotor leaves the directing magnetic component of said magnet substantially unaffected.

9. In an aircraft instrument, a universally mounted directional magnet, and means for stabilizing the same, including a gyro rotor consisting substantially entirely of an electrically insulating material, whereby rotation of said rotor introduces no disturbing magnetic influence.

PAUL KOLLSMAN.